(12) United States Patent
Battersby et al.

(10) Patent No.: US 6,470,873 B2
(45) Date of Patent: *Oct. 29, 2002

(54) SYSTEM AND METHOD FOR ESTABLISHING PITCH PARAMETERS IN A BALL-THROWING MACHINE

(75) Inventors: Gregory J. Battersby, Westport; Charles W. Grimes, Darien; Steve Van Geldern, Norwalk, all of CT (US)

(73) Assignee: ProBatter Sports, LLC, Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,952

(22) Filed: Feb. 6, 2001

(65) Prior Publication Data

US 2001/0006063 A1 Jul. 5, 2001

Related U.S. Application Data

(63) Continuation of application No. 09/457,808, filed on Dec. 9, 1999, now Pat. No. 6,186,133, which is a continuation-in-part of application No. 09/259,722, filed on Mar. 1, 1999, now Pat. No. 6,182,649.

(51) Int. Cl.⁷ .................................................. F41B 4/00
(52) U.S. Cl. ........................................................ 124/78
(58) Field of Search ....................... 124/6, 78; 473/451

(56) References Cited

U.S. PATENT DOCUMENTS

| | | | | |
|---|---|---|---|---|
| 4,442,823 A | * | 4/1984 | Floyd et al. | 124/78 |
| 5,125,653 A | * | 6/1992 | Kovacs et al. | 124/78 |
| 5,174,565 A | * | 12/1992 | Komori | 124/78 X |
| 5,359,986 A | * | 11/1994 | Magrath et al. | 124/78 |
| 5,464,208 A | * | 11/1995 | Pierce | 124/78 X |
| 6,026,798 A | * | 2/2000 | Sanders et al. | 124/78 |
| 6,082,350 A | * | 7/2000 | Crews et al. | 124/78 |
| 6,186,133 B1 | * | 2/2001 | Battersby et al. | 124/78 |

* cited by examiner

Primary Examiner—John A. Ricci
(74) Attorney, Agent, or Firm—Grimes & Battersby, LLP

(57) ABSTRACT

A ball-throwing machine is provided for throwing baseballs, softballs and the like, which machine includes a power head having three coacting wheels for propelling a ball toward a batter to simulate a variety of pitches at different speeds and different locations. Three AC motors and companion motor drives are provided for causing the wheels to rotate at predetermined speeds. The motor drives include dynamic braking circuits to permit rapid deceleration of the wheels. A pair of linear actuators is provided to permit the power head to be moved to predetermined horizontal and vertical positions. The pitches are established by providing a table of five separate data elements for each of said pitches, three of said data elements corresponding to the rotational speed of each of said wheels, and the remaining two data elements corresponding to the horizontal and vertical angular position of the power head. Each of these data elements is computed using a mathematical formula that linearly relates each element to the speed of the ball being propelled. A programmable controller is included for individually controlling the rotational speed of each individual wheel, the horizontal position of the power head and the vertical position of the power head. A smart card reader may be employed for programming of the controller and the machine is adapted to be used in conjunction with a video display to simulate the actual pitching of a baseball by a pitcher. The machine is able to interchangeably deliver pitches of different types to different locations at different speeds with less than ten-second intervals between pitches.

6 Claims, 13 Drawing Sheets

The data shown here is reflected in the plot below by the squares and diamonds. Linear regression was used to generate the lines that "best fit" this data and to formulate the following equations for calculating wheel settings based on the speed of the fastball to be thrown.

Setting A&C=(45.759*Pitch Speed)+632

Stting B=(64.232*Pitch Speed)+3421

$$z = \begin{bmatrix} 100 & 5250 & 9780 \\ 98 & 5125 & 9691 \\ 96 & 5000 & 9600 \\ 94 & 4922 & 9519 \\ 92 & 4833 & 9346 \\ 90 & 4744 & 9200 \\ 88 & 4620 & 9100 \\ 86 & 4566 & 9001 \\ 84 & 4477 & 8829 \\ 82 & 4388 & 8657 \\ 80 & 4325 & 8500 \end{bmatrix}$$

$z := \text{READPRN}(fb)$ $m := \text{slope}(z^{<0>}, z^{<1>})$ $b := \text{intercept}(z^{<0>}, z^{<1>})$ $m1 := \text{slope}(z^{<0>}, z^{<2>})$ $b1 := \text{intercept}(z^{<0>}, z^{<2>})$ $m = 45.759 \quad m1 = 64.232$ $b = 631.682 \quad b1 = 3421.227$ $i := 0..10$ $x_i := x_{i,0}$ $y_i := z_{i,1}$ $y1_i := z_{i,2}$ $AC_i := m x_i + b$ $B_i := m1 x_i + b1$

FIG. 12

| Pitch Speed (MPH) | Calculated Motor Setting A&C | Calculated Motor Setting B |
|---|---|---|
| 100 | 5208 | 9844 |
| 98 | 5116 | 9716 |
| 96 | 5025 | 9587 |
| 94 | 4933 | 9459 |
| 92 | 4842 | 9331 |
| 90 | 4750 | 9202 |
| 88 | 4658 | 9074 |
| 86 | 4567 | 8945 |
| 84 | 4475 | 8817 |
| 82 | 4384 | 8688 |
| 80 | 4292 | 8560 |

FIG. 14

SYSTEM AND METHOD FOR ESTABLISHING PITCH PARAMETERS IN A BALL-THROWING MACHINE

RELATED APPLICATIONS

This is a continuation of U.S. patent application Ser. No. 09/457,808 filed on Dec. 9, 1999, now U.S. Pat. No. 6,186,133, in the name of Gregory J. Battersby, Charles W. Grimes and Steven Van Geldern which, in turn, was a continuation-in-part of U.S. patent application Ser. No. 09/259,722 filed on Mar. 1, 1999, now U.S. Pat. No. 6,182,649, in the name of Gregory J. Battersby, James Cobb, Charles W. Grimes, Richard Schile, PhD, and Steven Van Geldern for Ball-Throwing Machine.

BACKGROUND OF THE INVENTION

1. Field of the Invention

The present invention relates generally to a ball-throwing machine and, more particularly, to such system and method for establishing pitch parameters in a ball-throwing machine that is adapted to pitch baseballs and softballs and throw tennis and other balls interchangeably to different locations and at different speeds and with different spins, where the ball-throwing machine has a power head having three coacting wheels for propelling a ball toward a batter to interchangeably simulate pitches of different types to different locations at different speeds. Each of these pitch parameters correspond to the rotational velocity of the drive wheels and the horizontal and vertical angular positions of the machine. Each parameter may be computed using a mathematical formula that linearly relates the parameter to the speed of the ball being propelled. The invention has particular applicability as a baseball pitching machine for both professional and amateur athletes in that it interchangeably delivers a variety of pitches (i.e., fastballs, curveballs, changeups, etc.) interchangeably at different speeds to different locations, without the need for manually readjusting or repositioning the machine between pitches.

2. Description of the Prior Art

Pitching machines and ball-throwing machines are well-known in the art and generally fall into four categories: (1) machines that employ a spring actuated arm mechanism to propel the ball; (2) machines that employ at least one rotating wheel or a pair of rotating, coacting wheels to propel the ball; (3) machines that rely on pneumatic pressure to propel the ball; and (4) machines that employ converging and diverging rotatable discs to propel the ball.

Examples of ball-throwing machines that employ a spring mechanism to propel the ball are described, for example, in U.S. Pat. No. 3,757,759 which issued on Sep. 11, 1973 to J. G. Haworth for Automatically Varied Oscillation Type Ball Projecting Device and U.S. Pat. No. 4,524,749 which issued on Jun. 25, 1985 to Paul S. Giovagnoli for Spring-Type Ball Pitching Machine. Commercial versions of such a machine have been marketed by Master Pitching Machine of Kansas City, Mo.

In recent years, the majority of the commercially available ball-throwing or pitching machines employ one or two coacting rotating wheels which are used to propel a ball that is introduced into the nip between the rotating wheels or between a plate and a single rotating wheel. Examples of such machines are described in U.S. Pat. No. 3,724,437 which issued on Apr. 3, 1973 to E. W. Halstead for Ball-throwing Machine; U.S. Pat. No. 3,815,567 which issued on Jun. 11, 1974 to Norman S. Serra for Coacting Wheel Ball Projecting Device; U.S. Pat. No. 4,197,827 which issued to Tommy L. Smith on Apr. 15, 1980 for Coacting Wheel Ball Projecting Device; U.S. Pat. No. 4,423,717 which issued to Edward W. Kahelin on Jan. 3, 1984 for Variable Double Wheel Ball Propelling Machine; U.S. Pat. No. 4,583,514 which issued to Fujio Nozato on Apr. 22, 1986 for a Ball-throwing Machine; and U.S. Pat. No. 4,922,885 which issued to Shigery Iwabuchi et al. on May 8, 1990 for a Pitching Machine. Commercial machines that employ a pair of rotating coacting wheels are marketed by The Jugs Company of Tualatin, Oreg., ATEC of Sparks, Nev., AAI American Athletic, Inc. of Jefferson, Iowa, K-Lin Specialties, Inc. of Huntington Beach, Calif. and OMNI Sports Technologies of Kansas City, Mo.

Machines that utilize a pair of coacting wheels are able to deliver a variety of different pitches, e.g., fastball, curve ball, screwball, etc. at a variety of different speeds. Changes in the pitch speed or pitch type are accomplished by varying the speed of the individual wheels and the angle of presentation relative to a horizontal and/or vertical plane. The ability of such machines to deliver different pitches is described, for example, in U.S. Pat. No. 3,288,127 which issued on Nov. 29, 1966 to J. C. Bullock for Baseball Pitching Machine with Ball Curving Device; U.S. Pat. No. 3,604,409 which issued to Ralph W. Doeg on Sep. 14, 1971 for Ball Projecting Machine with Direction Control Mechanism; U.S. Pat. No. 3,724,437 which issued on Apr. 3, 1973 to Earle W. Halstead for Ball-throwing Machine; U.S. Pat. No. 4,323,047 which issued on Apr. 6, 1982 to James K. McIntosh et al. for Automatic Ball Pitching Machine; U.S. Pat. No. 4,372,284 which issued to James A. Shannon et al. on Feb. 8, 1983 for Baseball-Pitching Machine; U.S. Pat. No. 4,655,190 which issued to Clifford V. Harris on Apr. 7, 1987 for Ball Pitching Machine with Selective Adjustment Between Drive and Pressure Wheels.

While rotating wheel machines are capable of varying the speed of the pitch and the type of the pitch, an inherent problem with such machines, however, is that they require extensive adjustments and realignment of the machine in order to change from one pitch to another or from one location to another. For example, if a coach seeks to change the pitch to be delivered by the machine from a 90 MPH fastball to a 75 MPH curve ball or from a fastball in one position in the strike zone to a fastball in another position, the coach must manually readjust the wheel speeds, reposition the angle of the wheels relative to a vertical and/or horizontal plane, and manually realign the horizontal and vertical position of the machine. It can take as long as five minutes to accomplish these changes before the machine is properly re-positioned to be able to deliver the next pitch. As a result, coaches tend to use these machines to deliver a series of the same pitch to the same location rather than attempting to interchangeably deliver different pitches to different locations as a pitcher would do in an actual game. Accordingly, these machines are of only marginal value in attempting to prepare a batter for game conditions. Such machines frequently give the hitter a false sense of security, e.g., believing that because they can hit the same pitch delivered repeatedly at the same speed to the same location they will succeed in actual game conditions.

Others have recognized this problem and incorporated devices in such machines to permit adjustment of both the horizontal and vertical position of such machines. See, for example, U.S. Pat. No. 5,174,565 which issued on Dec. 29, 1992 to Yutaka Komori for Baseball Pitching Machine; U.S. Pat. No. 5,344,137 which issued on Sep. 6, 1994 to Yutaka Komori for Method for Improving the Accuracy of a Baseball Pitching Machine; U.S. Pat. No. 5,359,986 which issued on Nov. 1, 1994 to Earl K. McGrath et al. for Pitching Machine and Method; and U.S. Pat. No. 5,437,261 which issued on Aug. 1, 1995 to Kerry K. Paulson et al. for Ball Pitching Device. While permitting minor adjustments for both horizontal and vertical position to accommodate for slight changes in pitch speed, none of these patents permit rapid changing of pitch type, i.e., fast ball to curve ball, etc. Such change would only be accomplished by a major re-positioning and re-adjusting the rotational velocity of the two coacting wheels.

Attempts have been made to use three coacting rotating wheels in a pitching machine to permit the delivery of different types of pitches without the need for repositioning the machine between pitches. U.S. Pat. No. 5,649,523 which issued on Jul. 22, 1997 to Jack C. Scott for Ball-throwing Apparatus and U.S. Pat. No. 4,442,823 which issued to Johnnie E. Floyd on Apr. 17, 1984 for Ball-throwing Machine and System Having Three Individually Controllable Wheel Speeds and Angles describe two such attempts. The machines described in these patents are not commercial, however, due, in large measure, to their failure to precisely control the horizontal and vertical positioning of the machine. Moreover, they both fail to carefully consider and control the forces of the three coacting wheels on the ball in order to consistently deliver a variety of different pitches with the accuracy and precision required.

Granada Pitching Machines of Central Point, Oreg. recently introduced a three-wheel pitching machine that incorporates limited controls over the individual wheel speeds. The machine, known as the Triton G-2000, fails to provide for horizontal and vertical adjustments of the aiming point and, as such, is incapable of delivering a plurality of different pitches at different speeds and locations on an interchangeable basis.

The concept of programming a pitching machine to deliver a variety of different pitches has been discussed in prior patents, most notably in U.S. Pat. No. 5,125,653 which issued to Ferenc Kovacs et al. on Jun. 30, 1992 for Computer Controller Ball-throwing Machine and U.S. Pat. No. 5,464, 208 which issued on Nov. 7, 1995 to Richard A. Pierce for Programmable Baseball Pitching. Such machines are of the two-wheel type and are incapable of rapid change in order to interchangeably deliver a variety of different pitches. Accordingly, the degree of programming offered by these devices is minimal, at best.

The marriage of a ball-throwing machine with a video display of a pitcher is described in U.S. Pat. No. 5,195,744 which issued on Mar. 23, 1993 to Neil S. Kapp et al. for Baseball Batting Practice Apparatus with Control Means. Such device, however, fails to offer the unique advantages of delivering a variety of different pitches as contemplated by the present invention. The synchronization means of such device relies upon an audio signal generated by the video, without any regard to the status of the ball in the queued position. Furthermore, the ball queuing system of this device relies on gravity and is imprecise and subject to failure.

SUMMARY OF THE INVENTION

Against the foregoing background, it is a primary object of the present invention to provide a system and method for establishing pitch parameters in a ball-throwing machine that can be used to interchangeably throw a variety of different types of balls including baseballs, softballs, tennis balls and the like with less than ten second intervals between throws, wherein the ball-throwing machine has a power head having three coacting wheels.

It is another object of the present invention to provide such a ball-throwing machine wherein such pitch parameters may be mathematically computed by applying a linear relationship to the speed of the ball.

It is yet another object of the present invention to provide such a ball-throwing machine that is able to interchangeably deliver a variety of different pitches to a variety of different locations at a variety of different speeds without the need to manually readjust the machine between pitches.

It is still another object of the present invention to provide such a ball-throwing machine that is able to deliver such pitches without the need for manual adjustment of the machine.

It is another object of the present invention to provide such a ball-throwing machine that allows a user to select the type, speed and location of each pitch or, alternatively, can be programmed to deliver a variety of pitches in a predetermined or random manner.

It is still yet another object of the present invention to provide such a ball-throwing machine in which the controls for such machine can be easily reprogrammed to simulate a predetermined or random pitch pattern.

To the accomplishments of the foregoing objects and advantages, the present invention, in brief summary, comprises a system and method for establishing pitch parameters in a ball-throwing machine of the type having a power head including three coacting wheels for propelling a ball toward a batter to simulate a pitch. In the preferred embodiment, the speeds of the three wheels are independently controllable so as to control the ball speed, spin rate and spin axis orientation. The pitch parameters correspond to the rotational velocity of each of said wheels and the horizontal and vertical angular position of the power head. Each of these pitch parameters correspond to the rotational velocity of the drive wheels and the horizontal and vertical angular positions of the machine. Each parameter may be computed using a mathematical formula that linearly relates the parameter to the speed of the ball being propelled. It will, of course, be appreciated that the machine can also be used to propel softballs, tennis balls, lacrosse balls and other ball-shaped objects.

The machine includes control means that include means for independently controlling the rotational speed of each wheel, means for independently controlling the alignment of the power head in the horizontal plane, and means for independently controlling the alignment of the power head in the vertical plane so as to permit said machine to interchangeably deliver pitches of differing types to different locations at different speeds. The means for controlling the rotational speed of each wheel further includes means for rapidly accelerating and decelerating the rotational speed of each wheel.

The control means also receives feedback from the means for independently controlling the rotational speed of each wheel, means for independently controlling the alignment of the power head in the horizontal plane, and means for independently controlling the alignment of the power head in the vertical plane so as to ensure the speeds and alignment have been reached.

In a preferred embodiment, the machine includes three coacting wheels for propelling the ball and a control system for simultaneously controlling the rotational speed of the wheels in combination with the horizontal and vertical alignment of the power head.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIG. 12 is a sample printout of the computer-aided design program showing the linear relationship between pitch speed and wheel rotational velocity in a fastball.

FIG. 14 is a sample table showing the resultant wheel rotational velocities using the linear relationship.

BRIEF DESCRIPTION OF THE PREFERRED EMBODIMENTS

Figure 1:
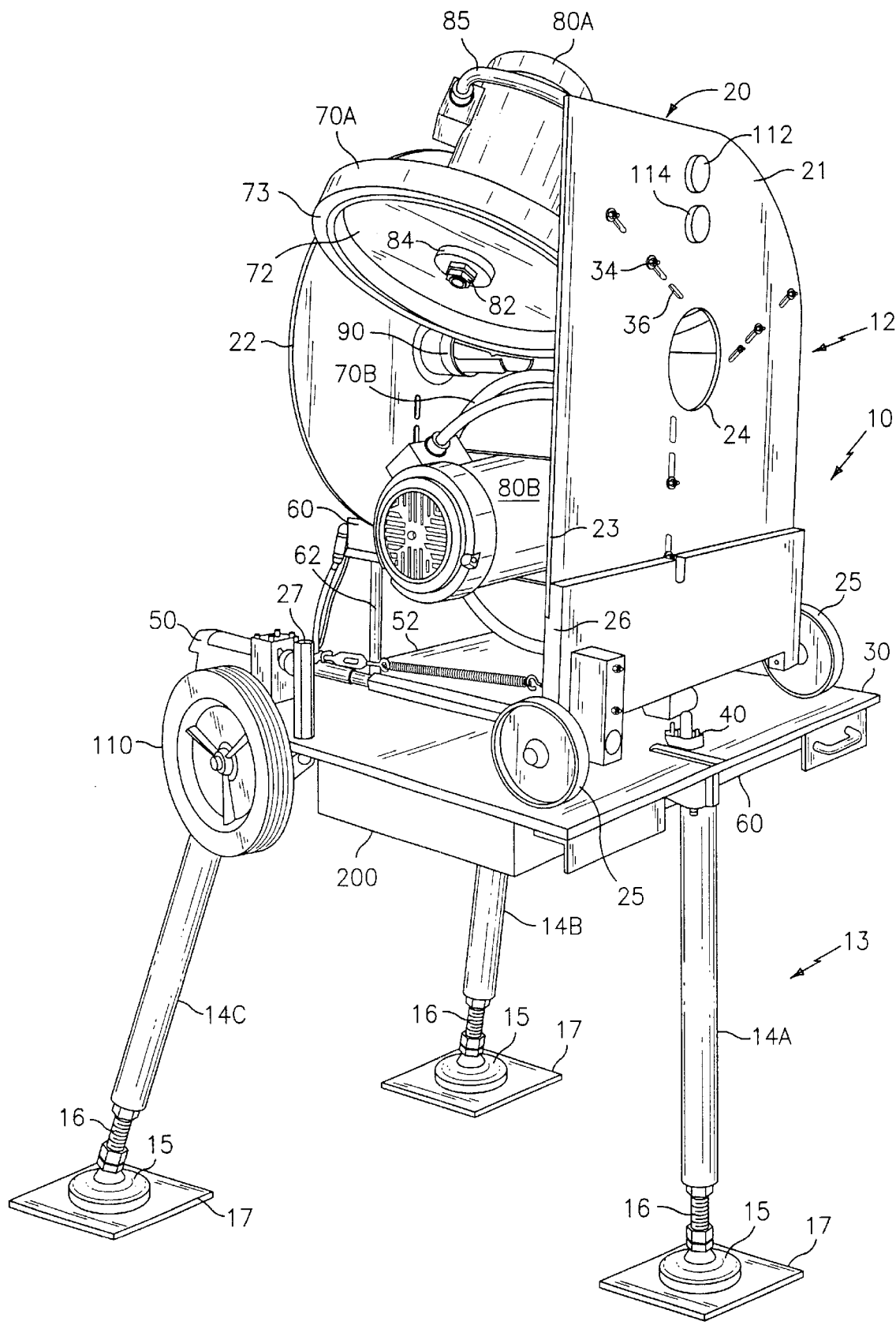
FIG. 1 is a perspective illustration of the ball-throwing machine of the present invention.
Figure 2:
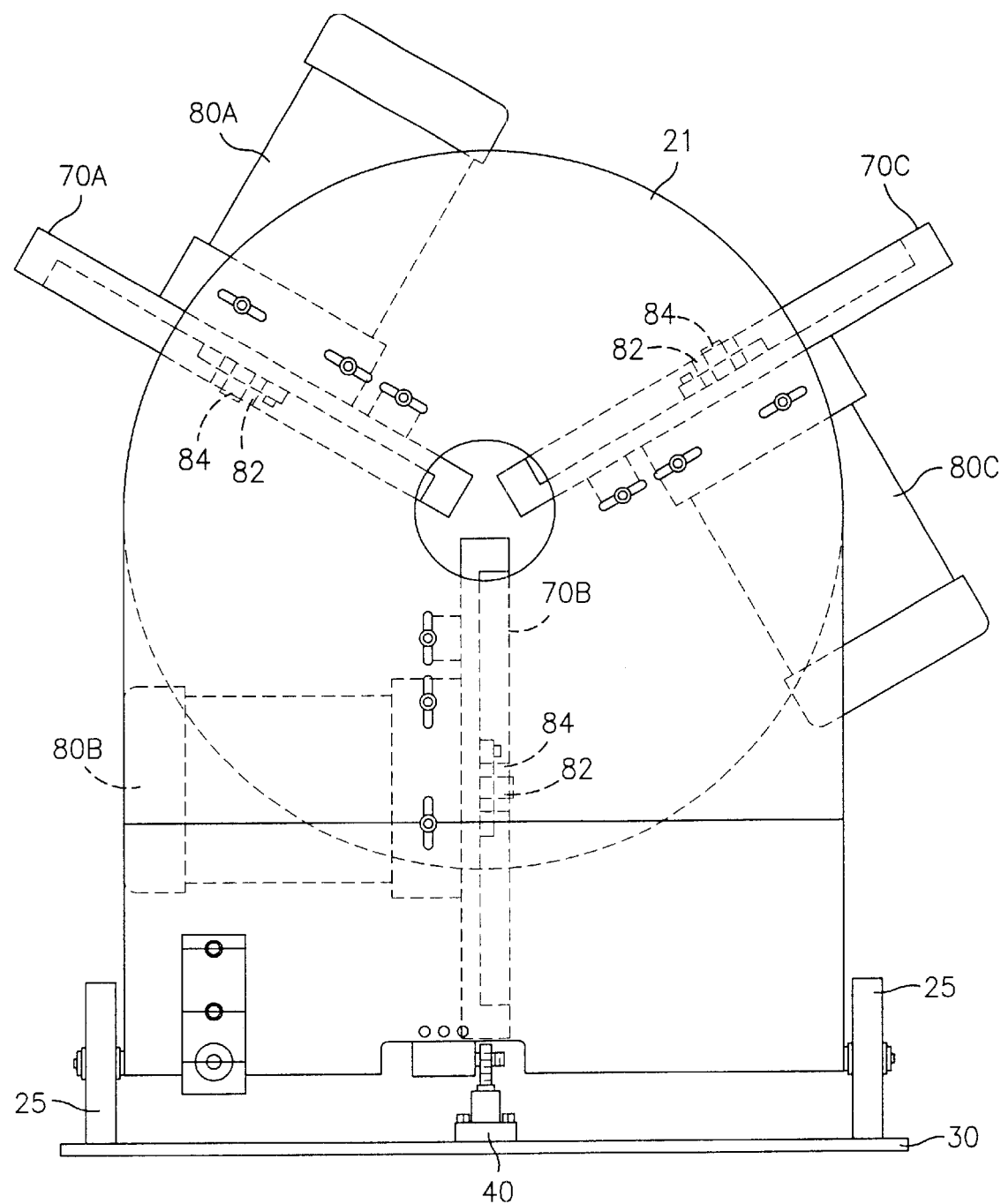
FIG. 2 is a front elevational view of the ball-throwing machine of the present invention.
Figure 3:
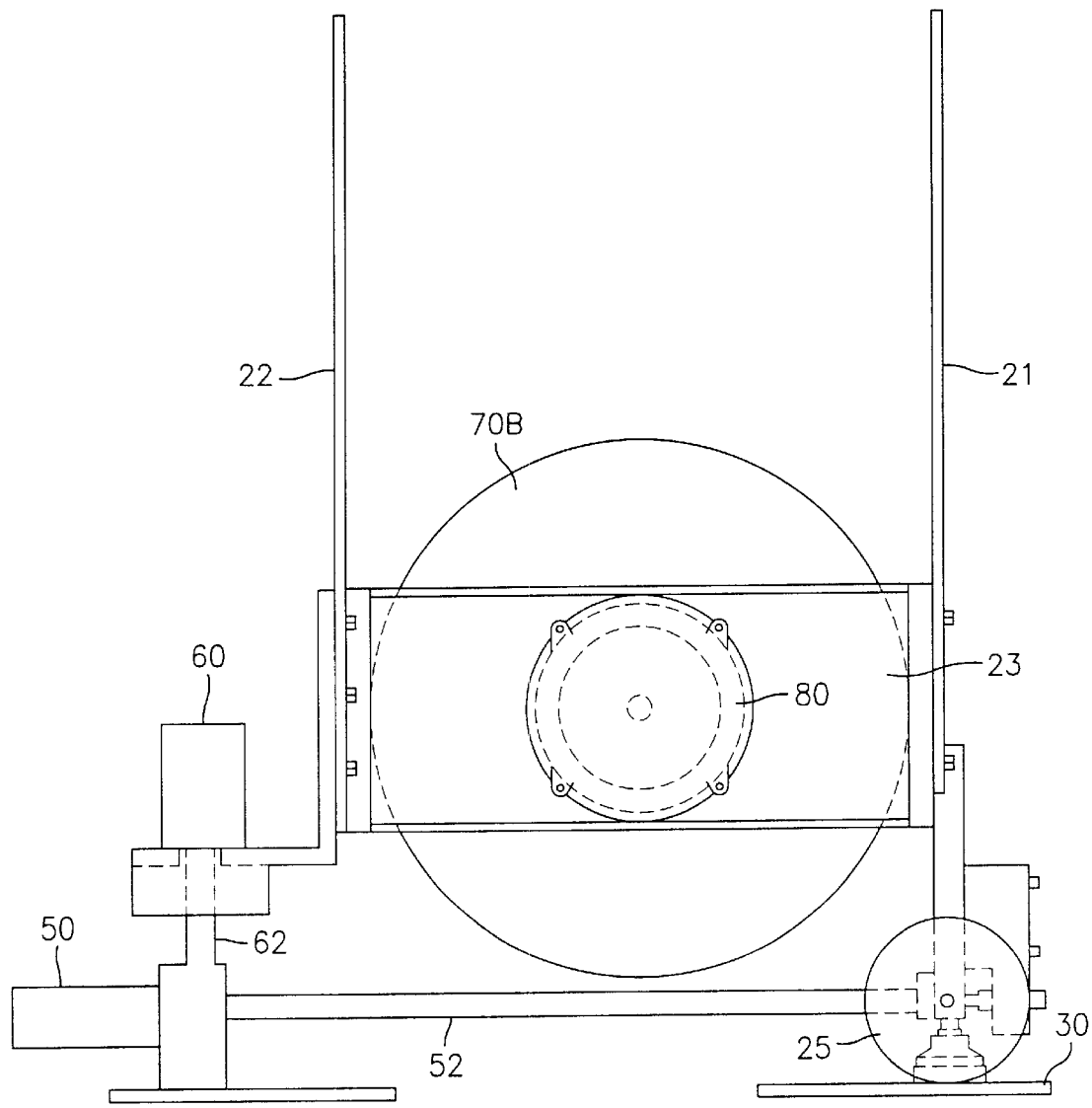
FIG. 3 is a side elevational view of the upper portion of the ball-throwing machine of the present invention.

Referring to the drawings and, in particular, to FIG. 1 thereof, the ball-throwing machine of the present invention is provided and is referred to generally by reference numeral 10. The machine 10 includes an upper portion 12 that is mounted on a base 13 that includes a plurality of removable legs 14, preferably a front leg 14A and a pair of rear legs 14B and 14C, respectively, to form a tripod. A shock-absorbing device such as a shock absorber (not shown) may be included in the rear legs 14B and 14C to minimize the impact of any recoil of the machine 10 during use.

An enlarged foot 15 is provided at the outbound end of each leg 14 and is threadably secured to the leg 14 by threaded extension fitting 16 which permits the length of each leg 14 to be increased and decreased. A flat, rubberized plate 17 may be included at the bottom of each foot 15 to provide additional stability for the machine 10, particularly when used indoors such as, for example, on a gymnasium floor. Ball-throwing machines experience substantial recoil upon delivery of each pitch and it is important to stabilize the machine and reduce the effect of such recoil in order to provide consistent, accurate, repeatable results.

Figure 4:
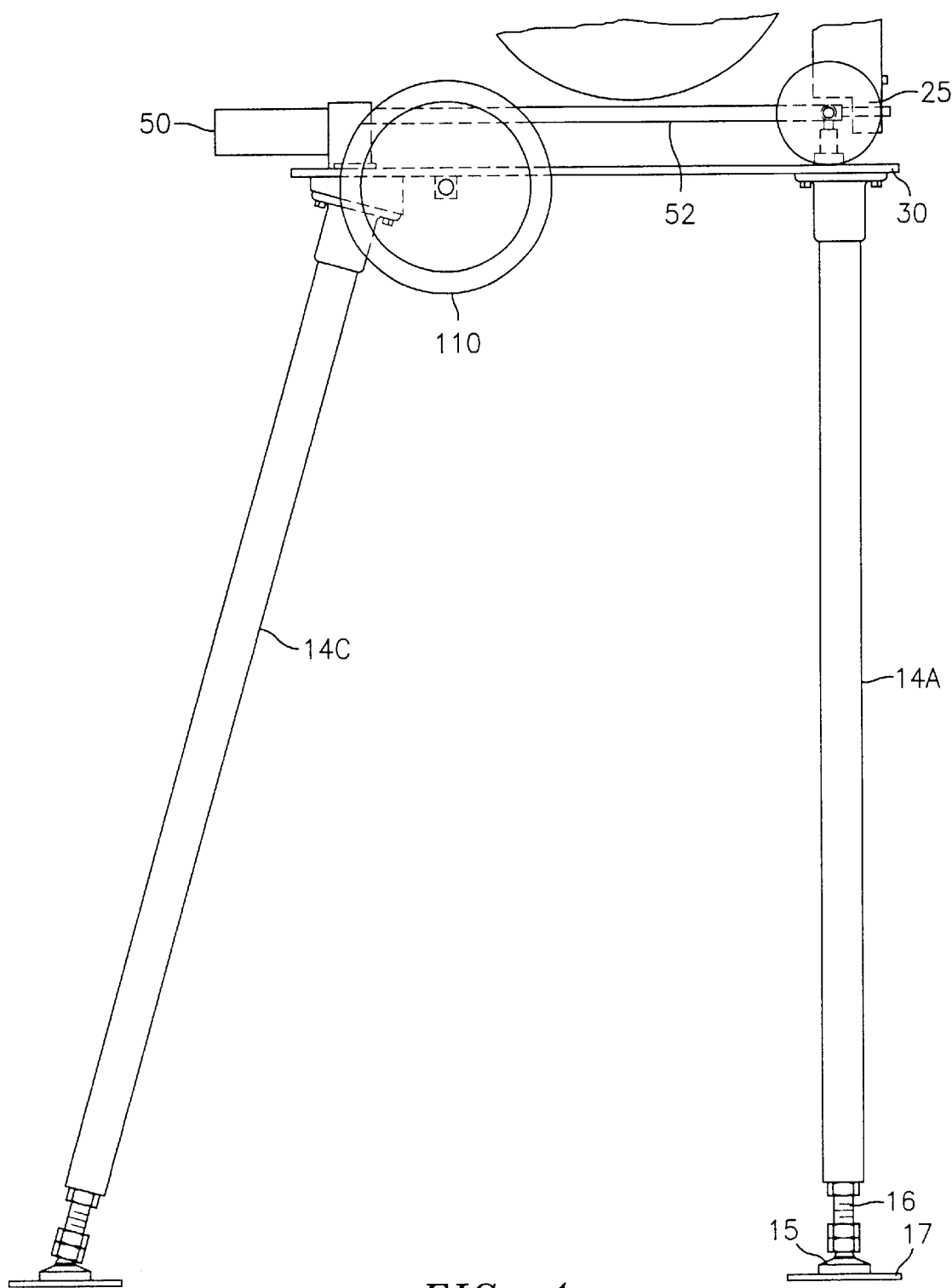
FIG. 4 is a side elevational view of the lower portion of the ball-throwing machine of the present invention.
Figure 5:
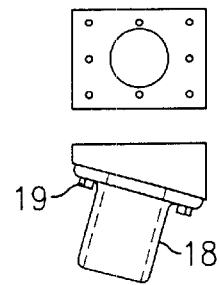
FIG. 5 is an enlarged sectional view illustrating the manner in which the extension legs engage the upper portion of the ball-throwing machine of the present invention.
Figure 6:
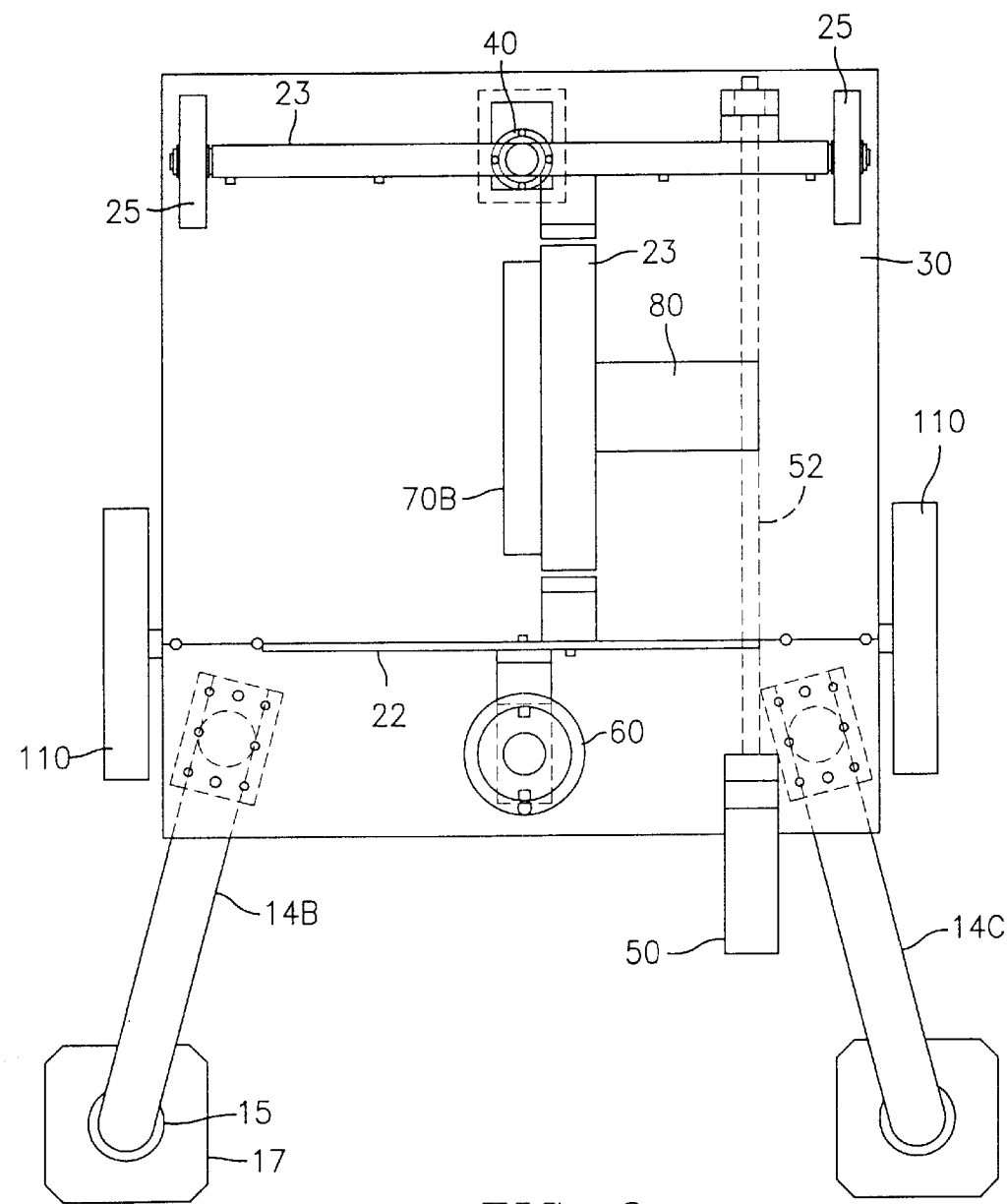
FIG. 6 is a top elevational view of the ball-throwing machine of the present invention.

As best shown in FIG. 4, the legs 14 are each attached to the upper portion 12 by insertion into and engagement with complementary sockets 18 mounted on the lower surface of the upper portion 12. The sockets 18 are secured to the upper portion 12 by bolts 19. The sockets 18 for the two rear legs 14B and 14C are angled relative to the horizontal plane of the upper portion 12 so that the rear legs 14B and 14C are positioned at approximately a 30 degree angle relative to the upper portion. This provides a wider base and offers greater stability for the machine 10.

Referring again to FIG. 1, the upper portion 12 includes a moveable power head 20 having at least two and preferably three coacting drive wheels 70A, 70B and 70C (only 70A and 70B are shown in FIG. 1) which serve to propel a ball introduced into the machine toward a desired location. It should be appreciated that the use of three coacting wheels permits the ball-throwing machine of the present invention to interchangeably deliver a variety of different pitches without the need for resetting the angle of the power head as is required in other machines such as, for example, the JUGS machine. In such a three wheel design, two wheels serve as the drive wheels while the third wheel serves to impart spin on the ball as it passes in the nip 92 between the coacting wheels 70A–70C.

The ball-throwing machine 10 of the present invention may be used to propel baseballs, softballs, tennis balls, lacrosse balls, and the like depending upon the size of the nip 92 between the coacting wheels 70A–70C.

In a preferred embodiment as illustrated in FIGS. 1–7, the three coacting wheels 70A–70C are positioned at equal distances and angles (120 degrees apart) relative to one another. Thus, in the configuration shown in these Figures, the wheels 70A–70C are positioned at the 10 o'clock, 2 o'clock and 6 o'clock positions. When so configured, when the user wants to throw a fast ball, the 10 o'clock and 2 o'clock wheels are set at the same speed while the bottom or 6 o'clock wheel is set at a higher speed so as to create backspin on the ball. This results in a rising fastball. Similarly, a changeup can be created by proportionally slowing the speed of the three wheels 70A–70C.

A sinking fast ball or "split finger fastball" can be created by decelerating the speed of the 6 o'clock wheel relative to the drive wheels. This creates a topspin on the ball which causes the pitch to "sink."

The ball-throwing machine 10 is capable of throwing a curve ball by controlling the speed differential of all three drive wheels. By increasing the speed of the 2 o'clock wheel and decreasing the speed of the 10 o'clock wheel relative to the speed of the 6 o'clock wheel, a rotational spin is imparted to the ball which causes it to break in a down and out direction thus simulating an actual curve ball. The amount of break of the pitch can be adjusted by increasing or decreasing the speed differential of the 2 o'clock and 10 o'clock wheels. Similarly, a slider or fast curve ball can be thrown by increasing the speed of all three of the drive wheels.

A screwball is achieved by decreasing the speed of the 2 o'clock and increasing the speed of the 10 o'clock wheel relative to the speed of the 6 o'clock wheel, causing the ball to rotate and break in a down and in direction.

A knuckleball can be thrown by setting each wheel at the same speed. This causes the ball to be propelled from the machine 10 with virtually no spin, thus creating a typical knuckleball. It should be appreciated, however, that the ability to control the delivery location of a knuckleball thrown by the machine is as difficult as the ability to control a knuckleball thrown by a live pitcher.

The upper portion 12 of the machine 10 is pivotally mounted to a base plate 30 at a center ball joint 40. The power head 20 is comprised of a front plate 21 and a rear plate 22, which are attached to one another by three motor mounts 23 that extend between the front plate 21 and the rear plate 22. An aperture 24 is provided in the approximate center of the front plate 21 of the power head 20 through which a ball will be propelled from the machine 10.

It should be noted that the motor mounts 23 are secured to the front plate 21 and the rear plate by a series of bolts 34 which pass through elongated grooves 36 in the front plate 21 and the rear plate 22. This permits the actual position of the motor mounts 23 and the wheels 70A–C which are mounted thereof to be adjusted to accommodate different sized balls, e.g., baseballs, softballs, lacrosse balls, tennis balls, etc. depending upon their position.

The power head 20 is further supported by a pair of pivot wheels 25 that are provided at the opposite sides of the front plate 21 and which permit the power head 20 to rotate in a horizontal direction on the base plate 30.

The power head 20 is adapted to pivot in a horizontal plane about the center ball joint 40 in order to change the horizontal position of the power head 20 relative to a center position and, therefore, the angle at which a ball is delivered to a batter. Actual movement of the power head 20 in a horizontal plane is effected by a horizontal linear actuator 50 which is provided on the upper surface of the base plate 30. Horizontal linear actuator 50 includes a horizontally extending shaft 52 which extends from the horizontal linear actuator 50 to the inside surface of the front plate 21. The horizontal linear actuator 50 serves to cause the power head to pivot in a horizontal direction about the front center ball joint 40.

A spring 26 holds the power head against the linear actuator 50 removing backlash from the linear actuator internal mechanism, thereby increasing the accuracy of the horizontal alignment of the power head 20. Spring 26 is secured between a post 27 that extends upwardly from the base plate 30 and the inside surface of the front plate 21.

The power head 20 is further adapted to pivot in the vertical plane about an axis defined by the center ball joint 40 and the wheels 25, in order to change the vertical angle of the power head 20 relative to the base plate 30 and, therefore, the vertical angle at which a ball is delivered to a batter. A vertical linear actuator 60 having a downwardly extending shaft 62 is provided on the outer surface of the rear plate 22. The vertical linear actuator 60 permits the power head 20 to pivot in the vertical plane about the front center ball joint 40.

It should be appreciated that the ability to move the power head 20 in both a horizontal and vertical direction is critical not only to be able to throw pitches to different locations in the strike zone but more importantly, to permit it to throw breaking pitches as well as pitches of differing speeds. Any ball-throwing machine that is intended to deliver interchangeable pitches of differing types must be able to be repositioned in the horizontal and vertical planes of the power head on a pitch by pitch basis.

The power head 20 is thus able to be repositioned in both a vertical and horizontal planes by the use of horizontal and vertical linear actuators. By extending or retracting the shaft 52 or 62 of such actuators 50 and 60, respectively, the power head 20 is moved in such directions by pivoting about the center ball joint 40.

For example, when one desires to change from a fastball to a changeup (where the speed of the pitch is decreased by at least 10 MPH), the trajectory angle of the pitch must be raised to overcome the effect of gravity on the slower pitch. To accomplish this, the power head 20 is pivoted about the center pivot 40 such that the angle of the pitch trajectory is raised to accommodate the effect of gravity on the pitch. This is accomplished by retracting the shaft 62 of the vertical actuator 60, thereby tilting the power head 20 in an upward direction.

Similarly, the power head 20 may be repositioned to throw a curve ball as follows. The shaft 62 of the vertical linear actuator 60 is retracted so as to cause the angle of trajectory of the pitch to rise while also changing the horizontal position of the power head 20 by retracting the shaft 52 of the horizontal linear actuator 50 causing the power head to point to the side of the plate away from the break.

By pivoting the power head 20 both horizontally and vertically about the center ball joint 40 located at the front of the machine 10, the actual movement of the machine in either or both a horizontal or vertical direction is minimized and, as such, is imperceptible to a batter. Such imperceptibility would be improved if both pivot axes passed through the aperture 24 in the front plate 20.

Figure 7:
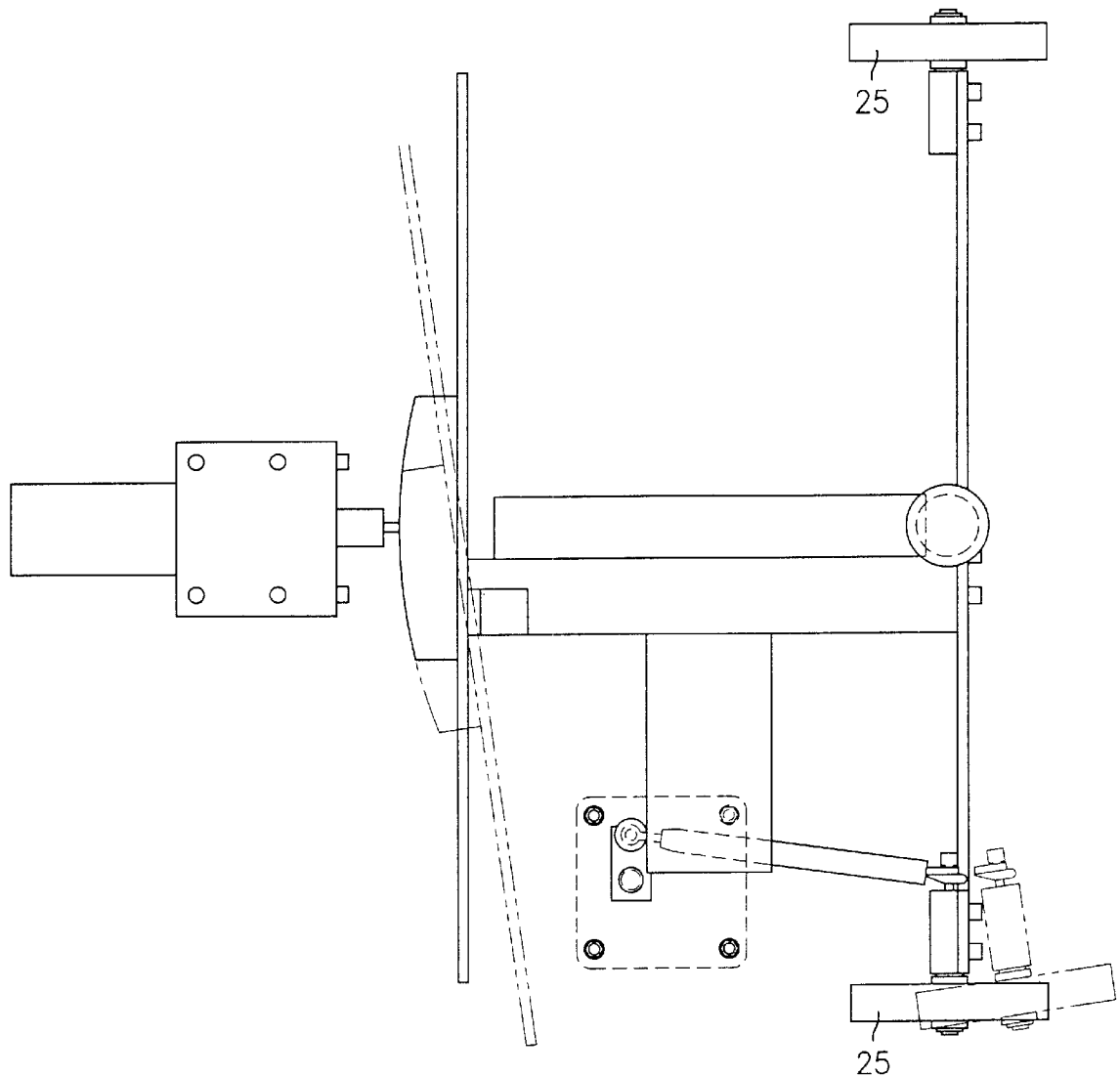
FIG. 7 is a top view of the ball-throwing machine of the present invention illustrating the manner in which the power head of the machine pivots in a horizontal plane.
Figure 8:
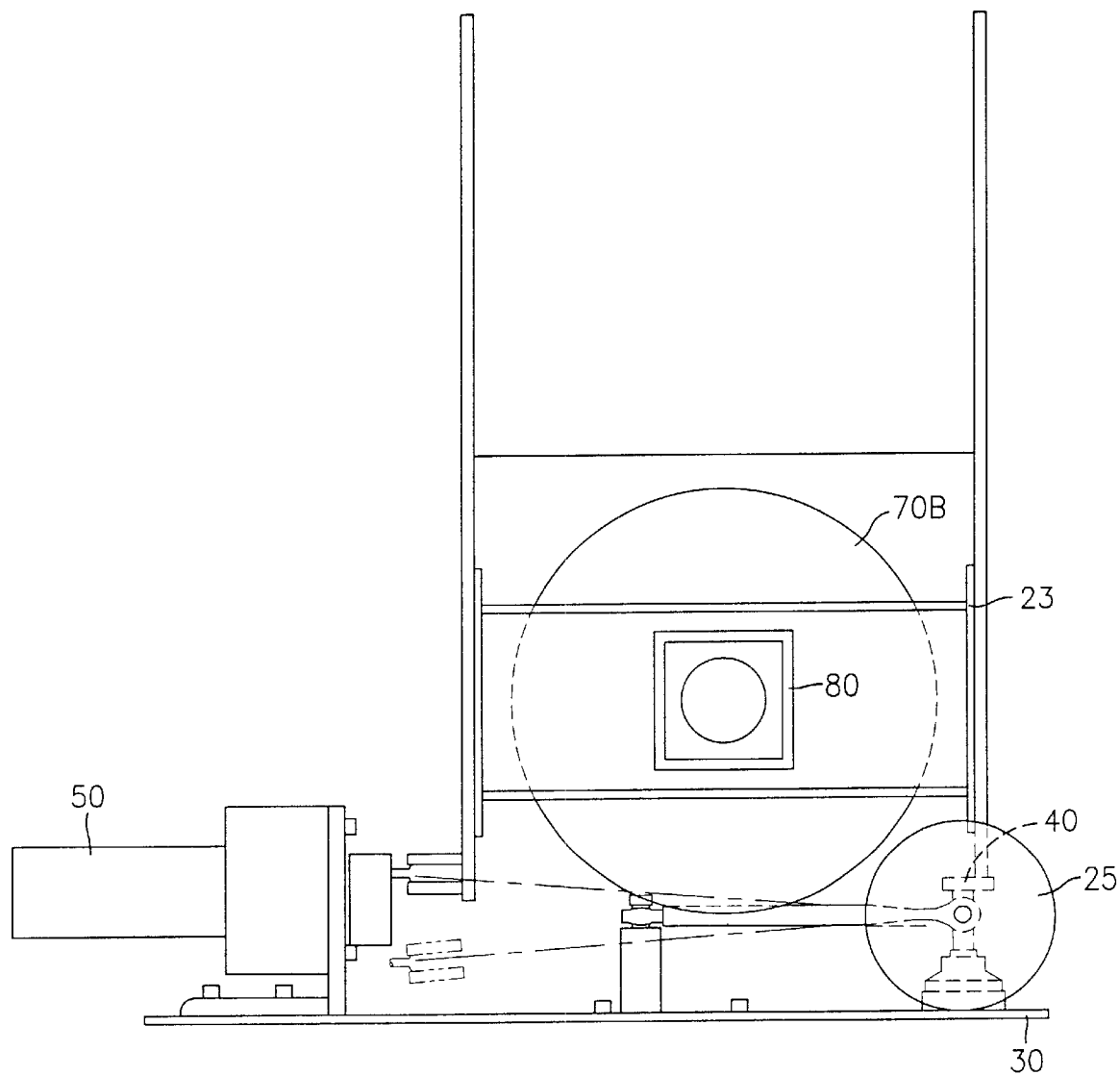
FIG. 8 is a side view of the ball-throwing machine of the present invention illustrating the manner in which the power head of the machine pivots in a vertical plane.

FIGS. 7 and 8 illustrate the manner in which the power head 20 rotates about the center ball joint 40 relative to the base plate 30 in both a horizontal and vertical direction. As shown in FIG. 7, one can effect rotation of the power head 20 in a horizontal direction by extension and retraction of the shaft 52 of the horizontal linear actuator 50. Pivot wheels 25 assist in rotation of the power head 20.

Similarly as shown in FIG. 8, the power head 20 is able to rotate in a vertical plane about the center ball joint 40 upon the extension and retraction of the shaft 62 of the vertical linear actuator 60. Obviously, repositioning the power head 20 will affect the eventual trajectory of the balls being propelled from the machine 10.

Control cables (not shown) connect the horizontal and vertical linear actuators 50 and 60 to remote actuator controls 204 and 206 contained in a remote control box 200 (see FIGS. 9–10) which can be mounted on the bottom of the base plate 30.

As shown in FIG. 1, the three coacting drive wheels 70A, 70B and 70C of the ball-throwing machine 10 each include a solid hub 72, preferably composed of aluminum, steel or composite material and an outer coating 73 of a deformable material having a relatively high coefficient of friction so as to permit the wheels 70A–70C to sufficiently grip a ball with a minimum of slip in order to propel it toward a batter. Preferred materials for this outer coating include urethane, nitrile rubber and butyl rubber and a preferred hardness for the material is between 25 and 60 Durometer A with a particularly preferred hardness between 40 and 50 Durometer A. While softer materials provide greater conformity to the balls being propelled and allow the machine to be used with a wider variety of balls, such materials have been found to lack the durability required for a commercial product. Moreover, materials having a hardness above 60 Durometer A typically cause a greater slippage of the balls during use which result in decreased machine accuracy.

While the diameter of the coacting wheels 70A–70C can be between eight and 20 inches, a diameter of between 12 and 16 inches is preferred. Wheels having a diameter of approximately 16 inches are particularly preferred. It has been found that larger wheels reduce slippage between the wheels and the balls, thereby increasing the accuracy of the machine. Similarly, larger wheels are advisable when attempting to achieve ultimate ball speeds greater than 90 MPH. Due to the speeds at which these wheels rotate, i.e., up to about 3500 RPM, it is preferable that the hubs be solid and balanced to minimize vibration.

The coacting wheels 70A–70C are each powered by drive motors 80 which are attached to the wheels by motor shafts 82 which extend through the motor mounts 23 and are secured to the wheels 70A–70C by "Tran torque" expanding bushings 84. While drive motors 80 can be virtually any DC or AC motor with sufficient power to rotate the wheels 70A–70C at the desired speeds, one of the essential elements of this machine 10 is the ability to rapidly accelerate and decelerate the coacting wheels 70A–70C to permit the machine to interchangeably deliver a variety of different pitches in a relatively short period of time, i.e., less than 7–10 seconds. There are situations where it is necessary to rapidly accelerate a wheel from, for example, 1200 RPM to 2500 RPM while, simultaneously decelerating another wheel from 2500 RPM to 1500 RPM.

The ability to rapidly accelerate and decelerate the speed of these wheels 70A–70C accurately coming to the new speed is a critical feature of this invention. The DC motors heretofore used by other ball-throwing machines were found to be incapable of achieving the rapid acceleration and deceleration of the coacting wheels required for such a machine. For example, one of the stated objectives of this ball-throwing machine is to be able to deliver different pitches within a 7–10 second time period to simulate actual batting practice conditions with live pitchers. This, of course, requires rapidly accelerating and decelerating certain wheels within this limited period to be able to deliver these different pitches.

It has been determined that such rapid and accurate acceleration and deceleration of the wheels can be easily achieved by the use of AC motors with companion motor drives including dynamic or regenerative braking circuits. Particularly good results have been achieved using a three phase, AC motor that is capable of providing at least ¾ HP. A particularly preferred AC motor is the 1 HP motor marketed by Baldor as model number VM 3116.

The drive motors 80 are each connected to remote variable speed AC motor drives 202A–202C in control box 200 (see FIG. 9) by cables 85. It is important that these AC motor drives include a dynamic or regenerative braking circuit to permit rapid deceleration of the coacting wheels 70A–70C in order to allow the rapid interchangeability of pitches. A particularly preferred AC motor drive is the AC Tech MC1000 Variable Frequency Drive marketed by AC Technology Corporation of Uxbridge, Mass. which includes a dynamic or regenerative braking circuit to permit rapid deceleration of the motor and wheel.

Ball introduction tube 90 shown in FIG. 1 is provided for introducing a ball into the ball-throwing machine 10 into the nip 92 formed between the coacting wheels 70A–70C. It will be appreciated that the ball-throwing machine 10 of the present invention may be operated either manually with a coach or other individual hand feeding balls to the machine or, alternatively, the machine 10 may be used in combination with a conventional automatic remote ball feeder of the type commonly used in conjunction with the JUGS and ATEC machines for automatically introducing balls into the machine 10 between the coacting wheels 70A–70C. It will be appreciated, however, that such automatic ball feeders must be modified to work in conjunction with the ball-throwing machine 10 of the present invention due to the movement of the power head 20. In this regard, it is necessary to provide for a flexible, preferably transparent connection between the ball feeder and the power head 20 to accommodate the movement of the power head 20. In either event, however, a ball is introduced into the nip 92 between the coacting wheels 70A–70C for propulsion through the machine 10.

A pointer device 100, preferably a laser pointer device, is provided on the base plate 30, preferably at the front or batter side thereof. The pointer device 100 is provided to assist the user in properly aligning the ball-throwing machine 10 in a manner that will be explained in detail herein.

A pair of transport wheels 110 is also provided on opposite sides of the base plate 30 to facilitate relocation and transportation of the machine 10. It will be appreciated that these wheels will permit the user to simply roll the machine onto or off the field before insertion of legs 14 preparatory to use of the machine 10.

Figure 9:
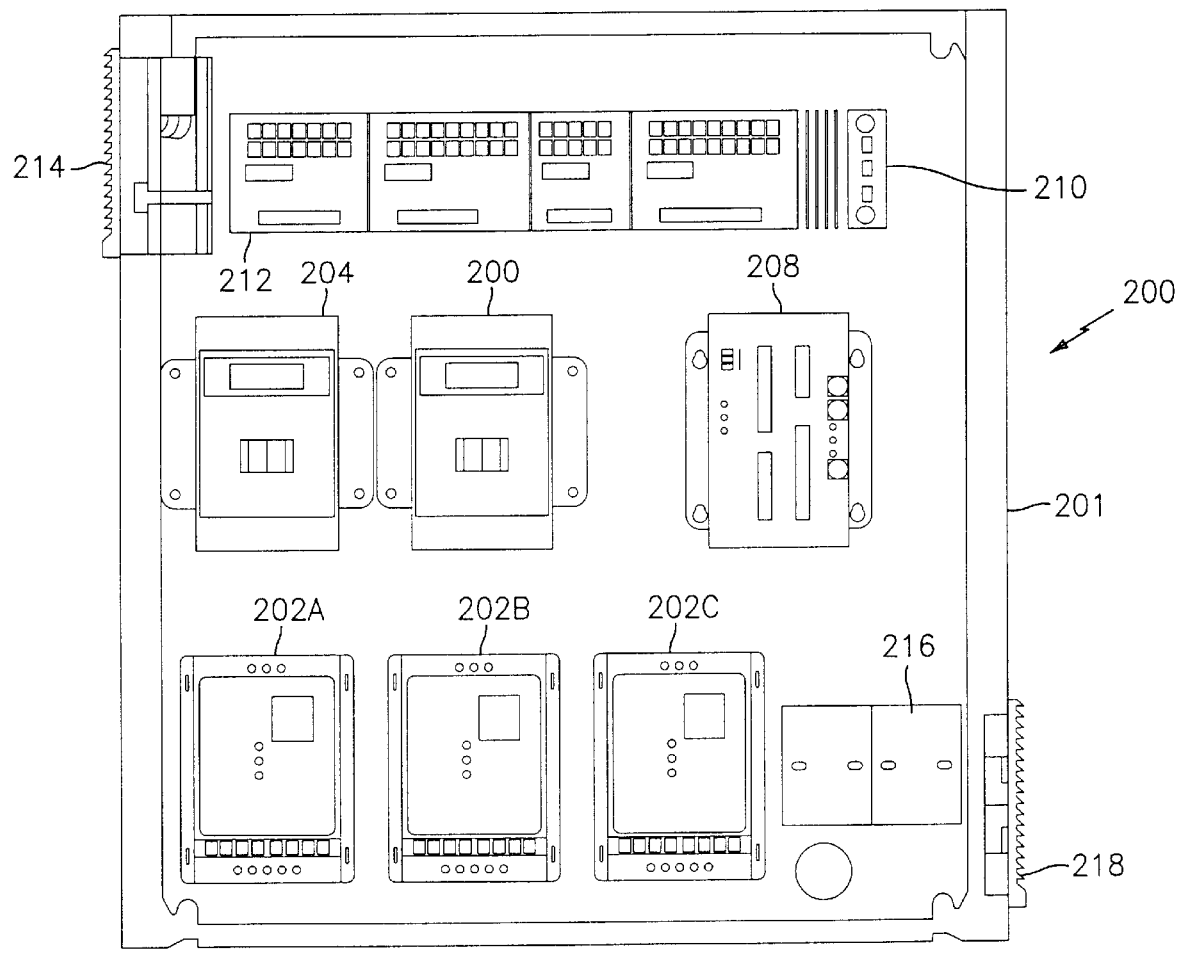
FIG. 9 is front view of the control panel used in conjunction with the ball-throwing machine of the present invention.

The ball-throwing machine 10 of the present invention is controlled by a programmable control unit 200 that is housed in a separate control box 201 (see FIG. 9). As illustrated in FIG. 1, the control unit 200 may be secured to the underside of the base plate 30 or, alternatively, as a separate stand-alone box which is connected to the ball-throwing machine by an umbilical cord (not shown). In either event, however, the control unit 200 is electrically connected to and provides the controls for the ball-throwing machine 10 of the present invention.

Figure 10:
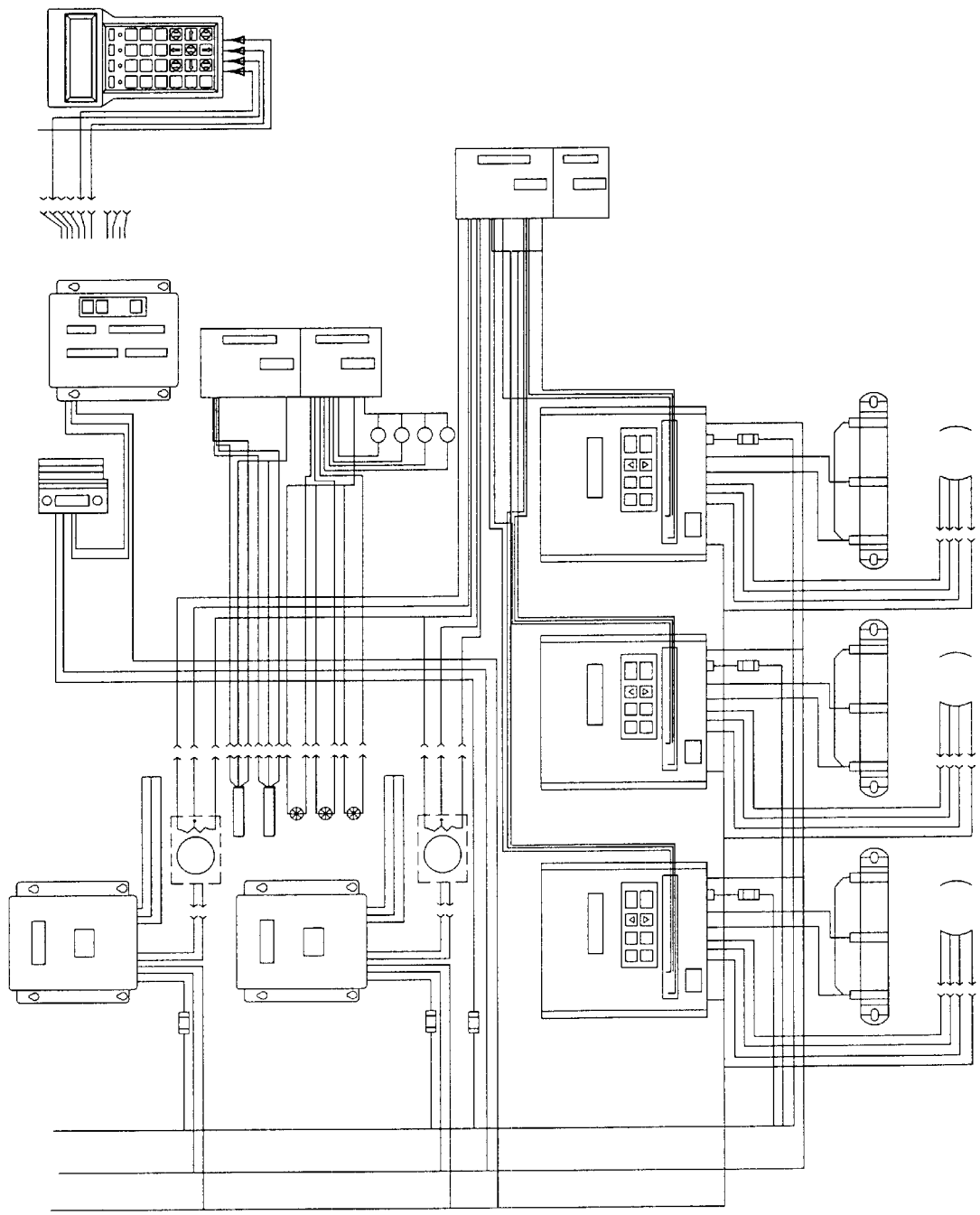
FIG. 10 is a schematic of the control panel used in conjunction with the ball-throwing machine of the present invention.

As shown in greater detail in FIGS. 9–10, the control unit 200 includes drive motor controls 202A–202C, which are electrically connected to and control their respective drive motors 80A–80C. As noted earlier, particularly preferred AC motor drives are the AC Tech MC1000 Variable Frequency Drive marketed by AC Technology Corporation of Uxbridge, Mass. which includes a dynamic braking circuit and resistors to permit rapid deceleration of the motor and coacting wheels 70A–70C.

A vertical actuator control 204 is provided which is electrically connected to and controls the vertical linear actuator 60. Similarly, a horizontal actuator control 206 is provided which is electrically connected to and controls the horizontal linear actuator 50. A programmable controller 208 is provided to control all of the various operations of the ball-throwing machine. A particularly preferred controller is the MultiPro+ MC controller, manufactured by Control Technology, Inc.

In addition, control unit 200 includes a controller power supply 210, controller terminal blocks 212, a filter fan 214, a fuse block 216 and an inlet filter 218.

As shown in greater detail in the schematic of FIG. 10, the controller 208 is electrically connected to and controls the drive motor controls 202A–C and the actuator drives 204 and 206. A remote handheld terminal 220 is electrically connected to the programmable controller 208 for use by a coach or user.

Figure 11:
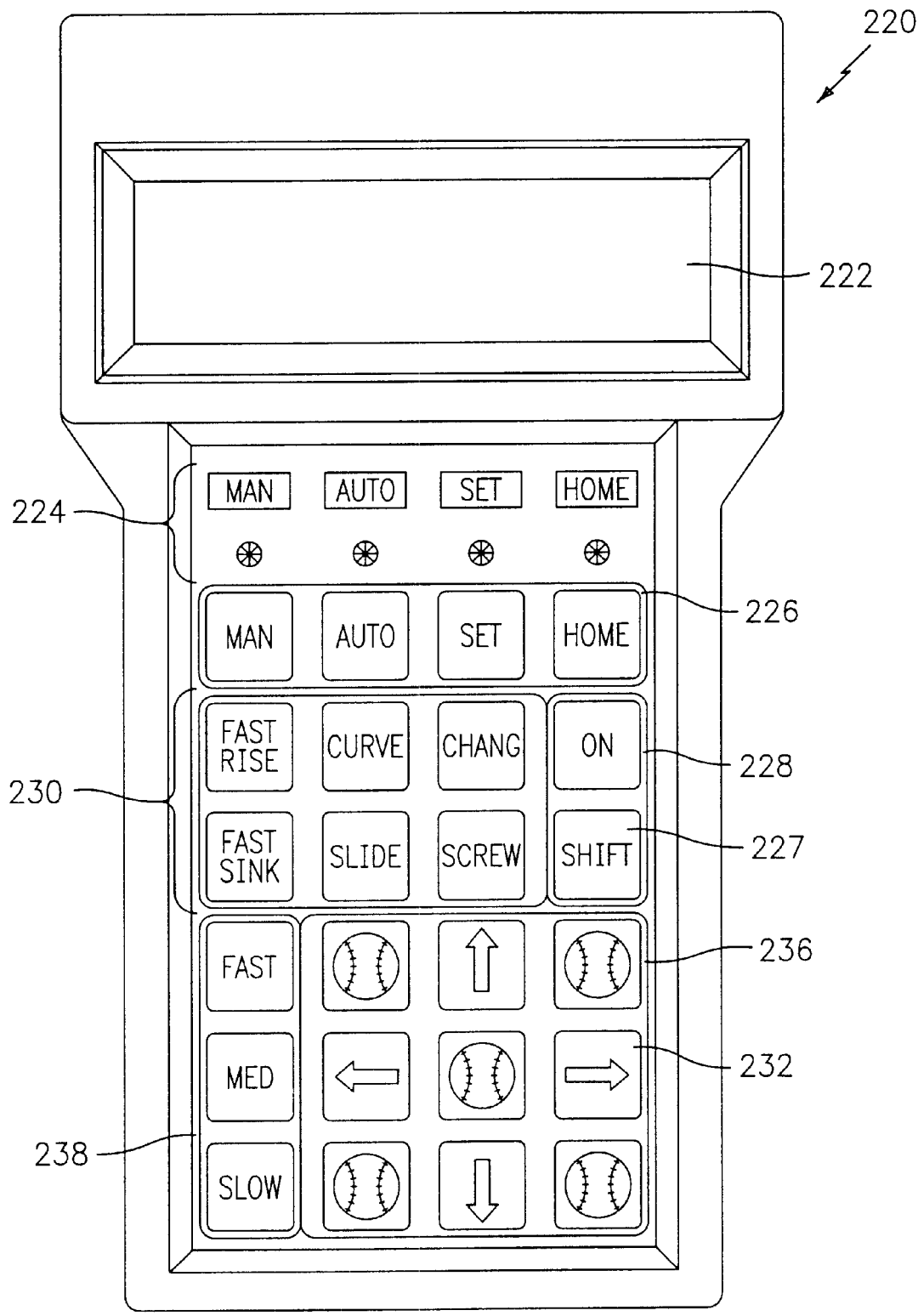
FIG. 11 is a front view of the controller used to control the ball-throwing machine of the present invention.

FIG. 11 depicts the layout of the remote handheld terminal 220 which is intended to be used by the coach or batter to control the ball-throwing machine of the present invention. The terminal includes a display area 222 where the type of pitch, location and speed are displayed using an LCD display. A series of mode LED's 224 are provided to indicate the mode in which the ball-throwing machine is to operate, i.e., manual, automatic, set and home. The mode LED's correspond to mode selection keys 226 which permit the user to select the actual mode of the machine which then result in an illumination of the corresponding mode LED's.

In the manual mode, the ball-throwing machine 10 is programmed to deliver a single pitch at a time corresponding to the pitch that is manually selected by the coach. Depression of the "Man" key of the mode selection keys 226 will cause the machine 10 to operate in the manual mode.

In the automatic mode, the ball-throwing machine 10 is programmed to deliver a series of pitches, e.g., twenty or more, in a predetermined sequence. Depression of the "Auto" key of the mode selection keys 226 will cause the machine 10 to operate in the automatic mode.

In the automatic mode, the user will be queried as to which sequence the user wants, e.g., right-hand pitcher to right-hand batter, left-hand pitcher to right-hand batter, etc., and which particular choice of sequence, e.g., the Kevin Brown series, etc. which would simulate an actual sequence of pitches delivered by a particular pitcher. The user may move from selection to selection using the "Position Adjustment Keys" 232.

The "Home" key 225 is intended to permit the user to "fine adjust" the vertical delivery of pitches to accommodate a particular batter. For example, it might be desirable to "lower" the over strike zone where the batter is 5' 6" and then raise it for the next batter who is 6' 2". Fine adjustment of the strike zone is accomplished using the Position Adjustment Keys 232 that have an arrow on their surface.

The "Shift" key 227 is the equivalent of the "Enter" key on a computer in that it actually enters the selections made by the user into the controller. The "Shift" key also serves to order the delivery of pitches in a manual mode.

An "On" key 228 is provided which serves as the on/off control for the machine 10.

The ball-throwing machine 10 is programmed to operate at predetermined set speeds, i.e., fast, medium and slow, and these are selected by depression of the appropriate "Pitch Speed Key" 238. For example, when programmed to operate in the fast mode, all pitches will be based on a 90 MPH fastball. In the medium mode, all pitches will be based on an 80 MPH fastball and in the slow speed, all pitches be based on a 70 MPH fastball. It should be appreciated that these settings are purely arbitrary and can be easily changed. For example, where the ball-throwing machine is intended to be used for a major league team, the three settings, i.e., fast, medium and slow, could be, for example, based on a 95 MPH fastball, a 90 MPH fastball and an 85 MPH fastball, respectively. Similarly, the actual number of pitch speed keys can be increased or decreased depending upon the particular application.

The actual type of pitch being delivered by the ball-throwing machine 10 of the present invention is selected by depression of the appropriate "Pitch Type Key" 230. The ball-throwing machine 10 of the present invention is programmed to deliver the following types of pitches: rising fastball, sinker or split-finger fastball, changeup, curveball and slider. Other pitches can be added, if desired.

Similarly, the location of the pitch in the strike zone can be controlled by depressing the appropriate "Pitch Location Key" 236 which have baseballs on their surface. The ball-throwing machine 10 has been preprogrammed to deliver pitches to five locations within the strike zone, i.e., high and outside, high and inside, low and outside, low and inside, and center, all based on a right hand batter. Depression of the appropriate Pitch Location Key 236 will direct the machine 10 to deliver the pitch to the appropriate location in the strike zone.

Obviously, these five locations are arbitrary and can be varied depending upon the particular application. For example, a coach might find it desirable to deliver pitches actually outside the strike zone to assist a hitter in learning the strike zone. Similarly, the number of locations within the strike zone can be changed to, for example, nine locations rather than the indicated five.

A data table is pre-programmed in the programmable controller 208 which determines the appropriate predetermined settings for the speed of each of the coacting wheels 70A–70C and the positions for the horizontal linear actuator 50 and vertical linear actuator 60 for each of the pitches selected and their location. An example of such a data table is included in Table 1, which establishes the respective wheel speed and the actuator settings for a series of pitches based on an 80-MPH fastball.

TABLE 1

MEDIUM (80 MPH) SERIES

| Pitch Type | Location | Pitch Speed | Wheel A Speed | Wheel B Speed | Wheel C Speed | Horizont. Setting | Vertical Setting |
|---|---|---|---|---|---|---|---|
| Fast Ball | 1 | 80 | 1150 | 1800 | 1150 | 763 | 500 |
| Fast Ball | 2 | 80 | 1150 | 1800 | 1150 | 755 | 535 |
| Fast Ball | 3 | 80 | 1150 | 1800 | 1150 | 775 | 535 |
| Fast Ball | 4 | 80 | 1150 | 1800 | 1150 | 755 | 470 |
| Fast Ball | 5 | 80 | 1150 | 1800 | 1150 | 775 | 470 |
| Sinker | 1 | 80 | 1400 | 1250 | 1400 | 761 | 765 |
| Sinker | 2 | 80 | 1400 | 1250 | 1400 | 750 | 795 |
| Sinker | 3 | 80 | 1400 | 1250 | 1400 | 775 | 795 |
| Sinker | 4 | 80 | 1400 | 1250 | 1400 | 750 | 725 |
| Sinker | 5 | 80 | 1400 | 1250 | 1400 | 775 | 725 |
| CurveBall | 1 | 69 | 1000 | 1000 | 1800 | 815 | 850 |
| CurveBall | 2 | 69 | 1000 | 1000 | 1800 | 805 | 890 |
| CurveBall | 3 | 69 | 1000 | 1000 | 1800 | 825 | 890 |
| CurveBall | 4 | 69 | 1000 | 1000 | 1800 | 805 | 825 |
| CurveBall | 5 | 69 | 1000 | 1000 | 1800 | 825 | 825 |
| Slider | 1 | 74 | 950 | 950 | 2150 | 812 | 850 |
| Slider | 2 | 74 | 950 | 950 | 2150 | 802 | 888 |
| Slider | 3 | 74 | 950 | 950 | 2150 | 822 | 888 |
| Slider | 4 | 74 | 950 | 950 | 2150 | 802 | 825 |
| Slider | 5 | 74 | 950 | 950 | 2150 | 822 | 825 |
| ScrewBall | 1 | 70 | 1850 | 1100 | 1100 | 725 | 870 |
| ScrewBall | 2 | 70 | 1850 | 1100 | 1100 | 715 | 900 |
| ScrewBall | 3 | 70 | 1850 | 1100 | 1100 | 740 | 900 |

TABLE 1-continued

MEDIUM (80 MPH) SERIES

| Pitch Type | Location | Pitch Speed | Wheel A Speed | Wheel B Speed | Wheel C Speed | Horizont. Setting | Vertical Setting |
|---|---|---|---|---|---|---|---|
| ScrewBall | 4 | 70 | 1850 | 1100 | 1100 | 715 | 835 |
| ScrewBall | 5 | 70 | 1850 | 1100 | 1100 | 740 | 835 |
| Changeup | 1 | 65 | 1000 | 1700 | 1000 | 765 | 620 |
| Changeup | 2 | 65 | 1000 | 1700 | 1000 | 755 | 650 |
| Changeup | 3 | 65 | 1000 | 1700 | 1000 | 775 | 650 |
| Changeup | 4 | 65 | 1000 | 1700 | 1000 | 765 | 590 |
| Changeup | 5 | 65 | 1000 | 1700 | 1000 | 775 | 590 |

With respect to the aforementioned table, the pitch type will designate the type of pitch desired and will correspond to the Pitch Type keys 230 on the hand held terminal 220, e.g., fastball, sinker, curveball, slider, screwball and changeup. Similarly, the location in the chart relates to the pitch location as determined by the Pitch Location key 236 on the terminal 220. Typically, a pitch down the center is designated by numeral 1 followed by a high and outside pitch "2", high and inside pitch "3", low and outside pitch "4" and low and inside pitch "5".

The individual wheel speeds for wheels A, B and C correspond to the wheel speeds for each of the individual coacting drive wheels 70A–70C. The horizontal setting corresponds to the setting on the horizontal actuator control 206 and the vertical setting corresponds to the setting on the vertical actuator control 204. Each of these settings may be derived manually by determining the optimal pitch settings for a particular pitch.

It will be appreciated that similar tables are constructed with respect to each of the pitch speed settings determined by the pitch speed key 238 on the hand held terminal 220, e.g., the slow series based on a 70 MPH fastball and the fast series based on a 90 MPH fast ball. As previously noted, these can vary according to the specific desired pitch speed.

As previously noted, the ball-throwing machine of the present invention can operate in an automatic mode in which the programmable controller 208 instructs the machine 10 to throw a predetermined sequence of pitches to predetermined locations, typically within a particular speed set. For example, the machine 10 can be programmed to throw a twenty pitch set in the following order: center fastball; fastball high and in; curve ball down and out; sinker down and in; fast ball high and in; screwball down and in; changeup down and out; fastball down and in; slider high and out; fastball high and out; screwball down and in; curveball down and out; etc. Virtually any combination of pitches can be programmed to establish the particular sequence and it can be created to achieve a right hand pitcher vs. a right hand batter; a right hand pitcher vs. a left hand batter; a left hand pitcher vs. a right hand batter; and a left hand pitcher vs. a left hand batter. Moreover, there are times that it might be necessary to change the particular pitch profile for a particular pitcher, e.g., to increase the break of the sinker for Hideo Nomo, etc. This can be accomplished by modifying the wheel settings in the data table to achieve a different pitch.

These data tables can be programmed into the controller 208 using a computer. To facilitate the re-programming of the data table, the programmable controller 208 can be attached to a remote magnetic strip "smart card" reader. In this manner, a particular pitch sequence can be stored on a smart card which may be read by the smart card reader to immediately re-program the controller 208 and, thereby, change the automatic pitch sequence. This would permit the user to be able to immediately change sequences to simulate a variety of different pitches. Similarly, the smart card can be used to change the profile of a particular pitch, e.g., a 98-MPH fastball for Roger Clemens rather than the "generic" 90-MPH fastball.

Thus, it is possible to develop a series of smart cards that could be used to program the machine 10 to simulate the profile of the actual pitches of a pitcher such as Kevin Brown and the sequence to which he might pitch a particular batter, such as Mike Piazza.

The ball-throwing machine 10 of the present invention can also be used in conjunction with a video display device on which a pitcher is actually depicted winding up and delivering a pitch. This, of course, offers the advantage of permitting a batter to time their swing against simulated live pitching. Video display devices have been used in commercial batting cages. One such device is marketed under the mark Power Alley by the MIR Corporation of Atlanta, Ga. Currently, such a device uses a conventional ball-throwing device to propel tennis balls to the hitter with no spin at speeds of less than 60 MPH.

Figure 13:
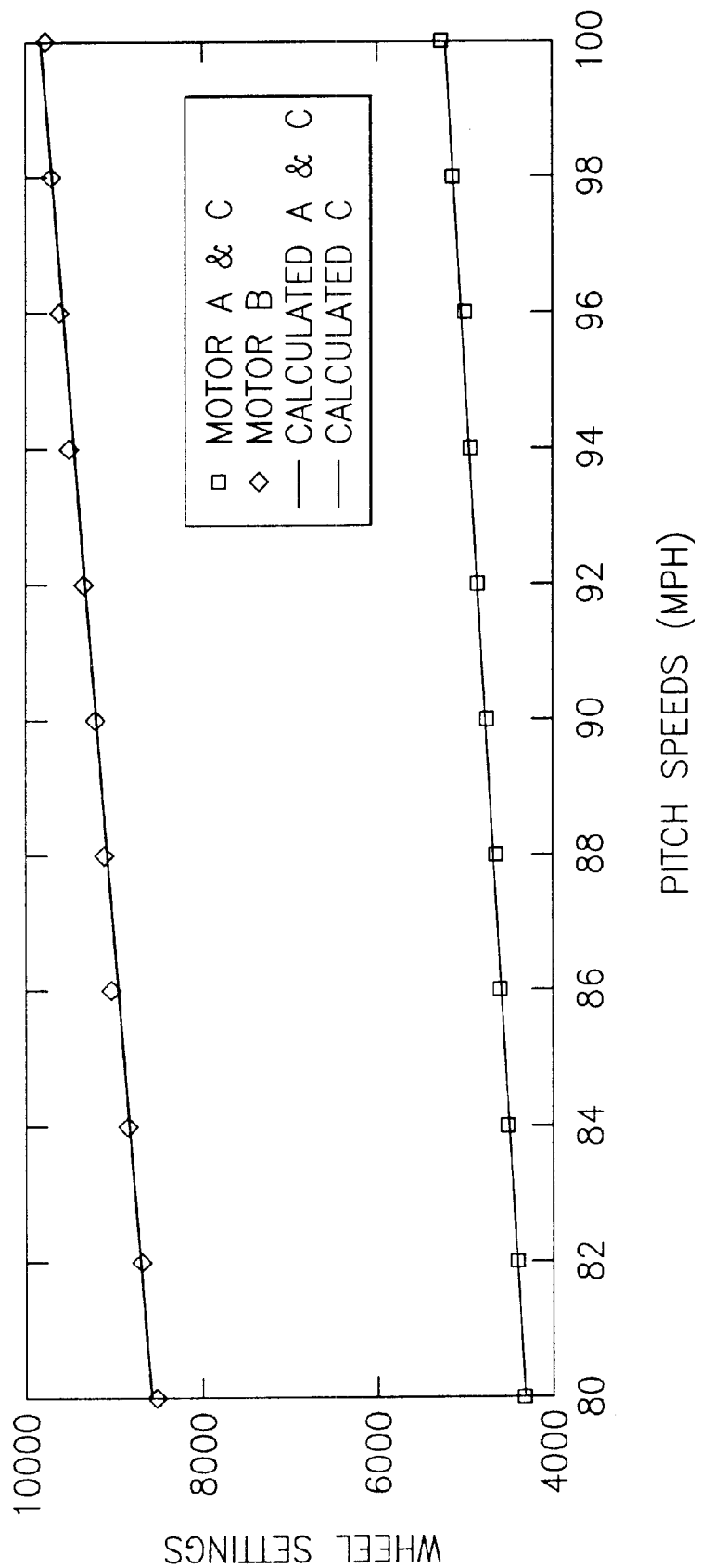
FIG. 13 is a sample graph showing the linear relationship between pitch speed and wheel rotational velocity in a fastball.

While the parameters of the pitching machine 10 corresponding to the wheel speeds of the coacting wheels 70A–70C and the horizontal and vertical positions of the actuators 206 and 204 may be derived manually by determining the optimal pitch settings for a particular pitch, in the preferred embodiment, each of these parameters is determined using a mathematical formula which relates the parameter to the speed of the pitch being delivered. Each of different pitch types has a different mathematical formula that relates the wheel speeds of the coacting wheels 70A–70C and the horizontal and vertical positions of the actuators 206 and 204 with the speed of the pitch being delivered, as shown in FIGS. 12–14.

A linear relationship between the parameter and the ball speed may be described by the following formula:

$$y = mx + b$$

wherein y corresponds to the parameter being computed (i.e., wheel speed or horizontal or vertical position) and x corresponds to the pitch speed, and wherein m and b are constants that correspond to the slope and intercept of the linear relationship. The wheel speed may best be described by a linear relationship, while the horizontal and vertical position may be described by an equation of a higher order.

The constants m and b may best be computed using a computer program capable of linear regression so as to generate a "best fit" for the data points generated manually for the wheel speeds and horizontal and vertical positions.

Computer programs capable of such linear regression are readily available on the mass market, and include such software titles as *MathCAD* and *Mathematica*.

In the preferred method, parameters for the wheel speed and horizontal and vertical positions are manually determined at both the lowest pitch speed and the highest pitch speed. By applying a linear formula to such parameters, settings may be computed for every pitch speed in between. In order to achieve the most accurate results, however, it is advisable to manually generate the parameters at various intermediate speeds (such as at every 5 miles per hour), prior to using the linear regression software to generate the linear formula.

It should be appreciated that a data table must be generated for each pitch type. For example, the linear relationships for a fastball will be very different from those for a curve. As shown in Table 1, for a fastball, the speeds of wheels 70A and 70C are identical, and their linear relationships are the same (as shown in FIG. 12). However, for a curve ball, the speeds of wheels 70A and 70B are the same, and their linear relationships are the same.

OPERATION OF MACHINE

The ball-throwing machine 10 of the present invention may be operated both outdoors on a field and indoors in a gymnasium or batting cage facility. It is positioned on the pitcher's mound or at a distance of approximately 60 feet (or 45 feet for Little League distances) from the batter's box. The ball-throwing machine 10 must initially be leveled and then properly aligned relative to home plate. In order to assist in the proper alignment of the ball-throwing machine, the laser pointer device 100 is used to project a laser beam toward home plate against a target (not shown) which is positioned at the center of the intended strike zone. The ball-throwing machine 10 should be manually positioned such that the laser beam falls in the center of the target. Horizontal adjustment of the ball-throwing machine 10 is accomplished by simply repositioning the machine 10 in a horizontal direction while vertical adjustment is accomplished by raising or lowering the front leg 14A of the base 13.

When the ball-throwing machine 10 is properly positioned relative to home plate, it is ready for operation. It should be appreciated that upon startup of the machine 10, the control unit 200 automatically positions the power head 20 in a center position for a center fast ball at the medium speed. That is the "home" or default position and the power head 20 will always return to that position on startup.

If the machine is to be used with particularly short or particularly tall batters, the machine can be adjusted to accommodate a particular strike zone either manually or automatically. Manual adjustment is accomplished by changing the vertical height of the front leg 14A by adjusting the extension fitting 16. Alternatively, it is possible to "fine tune" the strike zone in a vertical direction using the "home" feature on the handheld terminal 220 using the up and down arrows of the pitch selection keys 232. Upon startup of the machine 10, however, any previous "fine tune" adjustment is lost and the power head 20 of the machine 10 returns to its normal default position.

Balls can be introduced into the ball-throwing machine 10 either manually by a coach or automatically using a conventional ball feeder device (not shown). As previously noted, the machine 10 is adapted to be used in conjunction with a conventional elongated sleeve feeder device of the type commonly used with commercial pitching machines such as the JUGS and ATEC machines. As the power head 20 of the present ball-throwing machine 10 is movable, it is necessary to connect the ball feeder to the ball introduction tube 90 using a flexible, preferably transparent, connection to allow the batter to actually see the delivery of the ball into the machine 10.

Such feeders are electrically wired to the control unit 200, which controls the release of balls either manually or automatically at predetermined time intervals. For example, when the machine is in the manual mode, balls will be released upon the depression of the "Shift" key 227 on the terminal 220. When put in the automatic mode, balls will be released at predetermined time intervals.

Upon proper positioning of the ball-throwing machine 10 relative to home plate, the machine is turned on by depression of the ON/OFF switch on the terminal 220. Upon activation of the ON/OFF switch, the machine immediately goes to a default setting in which the machine is set to pitch a Medium fastball down the center of home plate.

The user then has the option of operating the machine 10 in either a manual or an automatic mode and this selection is made by depression of the appropriate mode selection key 226. In the manual mode, the user is prompted to make three choices: the speed selection, i.e., fast, medium or slow; the pitch type, i.e., fast ball, sinker, curve ball, slider, changeup and screwball; and the pitch location, i.e., one of five locations in the strike zone. The appropriate selection is made by depression of the applicable key on the terminal 220. These keys can be depressed in any order and upon depression of the applicable key, the relevant information will be displayed on the display area 222.

Upon entering the applicable information, the user is prompted to hit the "Set" key on the terminal and information is stored in the controller 208. This determines the appropriate settings for the particular pitch at the particular location from the stored data table and then sends signals to the drive control motors 202A–202C, the horizontal actuator controller 206 and the vertical actuator controller 204 providing them with the applicable settings for the particular pitch. This data table is generated using linear relationships for each pitch type that relates the speeds of the drive wheels 70A–70C and the horizontal actuator control 206 and vertical actuator control 204 to the speed of the pitch. Upon receipt of the applicable signal, each of the drive motor controls 202 set their corresponding drive motors 80 to the specified speed to accomplish the desired wheel speed and the two actuator controllers 204, 206 set their corresponding actuators to the specified positions to position the power head 20 in the desired position. The affect of this is to reposition the power head 20 in the proper position to deliver the specified pitch to the predetermined position with the coacting wheels 70A–C rotating at an appropriate speed to deliver the selected pitch.

The controller waits for the proper feedback from the drive control motors 202A–202C, horizontal actuator controller 206 and vertical actuator controller 204 to indicate the power head 20 is in the correct position and the wheels 70A–C are spinning at the correct rotational velocity. It typically takes between 3 and 4 seconds and always less than ten seconds for the power head 20 to move to the predetermined position. Upon reaching that position, the machine is ready to accept a ball which can be either released from an automatic feed device by depressing the "Shift" key 227 on the remote terminal 220 or, alternatively, by manually feeding a ball into the ball introduction tube 90. Upon reaching the nip 92 between the coacting wheels, the ball will be delivered to the batter by the machine.

The ball-throwing machine 10 can also be operated in an automatic mode by the depression of the "Auto" key on the terminal 220. Upon the depression of the "Auto" key, the user will be queried as to what sequence is desired. As previously noted, virtually an unlimited number of pitch sequences can be programmed including, for example, sequences based on the throwing arm of the pitcher and whether a batter is left handed or right handed. Actual choices will be made by using the "Position Adjustment Keys" 232.

Upon depression of the "Auto" key and selection of the particular sequence, the hitter then selects the appropriate pitch speed set by depression of the appropriate "Pitch Speed Key" 238. At that time, the control unit of the machine 10 takes over, delivering pitches to the batter in a predetermined sequence of particularly profiled pitches.

As previously noted, the controller 208 can be readily reprogrammed by the use of a smart card which is meant to work in conjunction with a smart card reader attached to the controller 208. In this manner, one could readily reprogram the machine 10 to deliver a predetermined sequence of pitches of a particular profile. This would permit the machine 10 to simulate the actual pitching sequence of a particular pitcher.

Having thus described the invention with particular reference to the preferred forms thereof, it will be obvious that various changes and modifications can be made therein without departing from the spirit and scope of the present invention as defined by the appended claims.

We claim:

1. A ball-throwing machine for throwing balls to a batter, said machine including:

means for propelling a ball toward a batter;

a microprocessor for controlling the release of said balls from said machine; and a smart card reader interconnected to said microprocessor, said smart card reader adapted to read pre-programmed smart card to program the microprocessor and control the release of said balls from said machine.

2. A ball-throwing machine for throwing a multiplicity of different pitches, said machine having a power head including at least one wheel for propelling a ball toward a batter, said power head adapted to move in both a horizontal and vertical direction, wherein said machine includes:

means for computing the rotational speed of said at least one wheel;

means for computing the vertical position of the power head;

means for computing the horizontal position of the power head;

a microprocessor for controlling the rotational speed of said at least one wheel, the vertical position of the power head and the horizontal position of the power head for each of said multiplicity of different pitches; and a smart card reader interconnected to said microprocessor, said smart card reader adapted to read a pre-programmed smart card and program the microprocessor to direct the ball-throwing machine to throw a pre-determined pitch.

3. The ball-throwing machine of claim 2, wherein said power head includes at least two wheels.

4. The ball-throwing machine of claim 2, wherein said smart card includes the applicable parameters of wheel speeds and vertical and horizontal positions required for the ball-throwing machine to throw a particular pitch.

5. The ball-throwing machine of claim 4, wherein said smart card contains a predetermined sequence of parameters necessary for the ball-throwing machine to throw said predetermined sequence of pitches.

6. A method for controlling a ball-throwing machine to throw a multiplicity of different pitches, said method comprising the steps of:

providing a ball-throwing machine having a power head including at least one wheel for propelling a ball toward a batter, said power head adapted to move in both a horizontal and vertical direction, said machine further including a microprocessor for controlling the rotational speed of said at least one wheel and the vertical and horizontal positions of the power head;

establishing the appropriate wheel speeds and vertical and horizontal positions of the power head for a particular pitch;

determining the linear relationship between said wheel speeds and vertical and horizontal positions for a particular pitch at different speeds using the formula:

$$y=mx+b$$

wherein y corresponds to the parameter being computed, x corresponds to the pitch speed and m and b are constants that corrrespond to the slope and intercept of the linear relationship; and programming the microprocessor to throw said at different speeds according to said formula.

* * * * *